COLOR KINESCOPE SET-UP PROCEDURES FOR COLOR TELEVISION RECEIVERS
Original Filed June 30, 1960
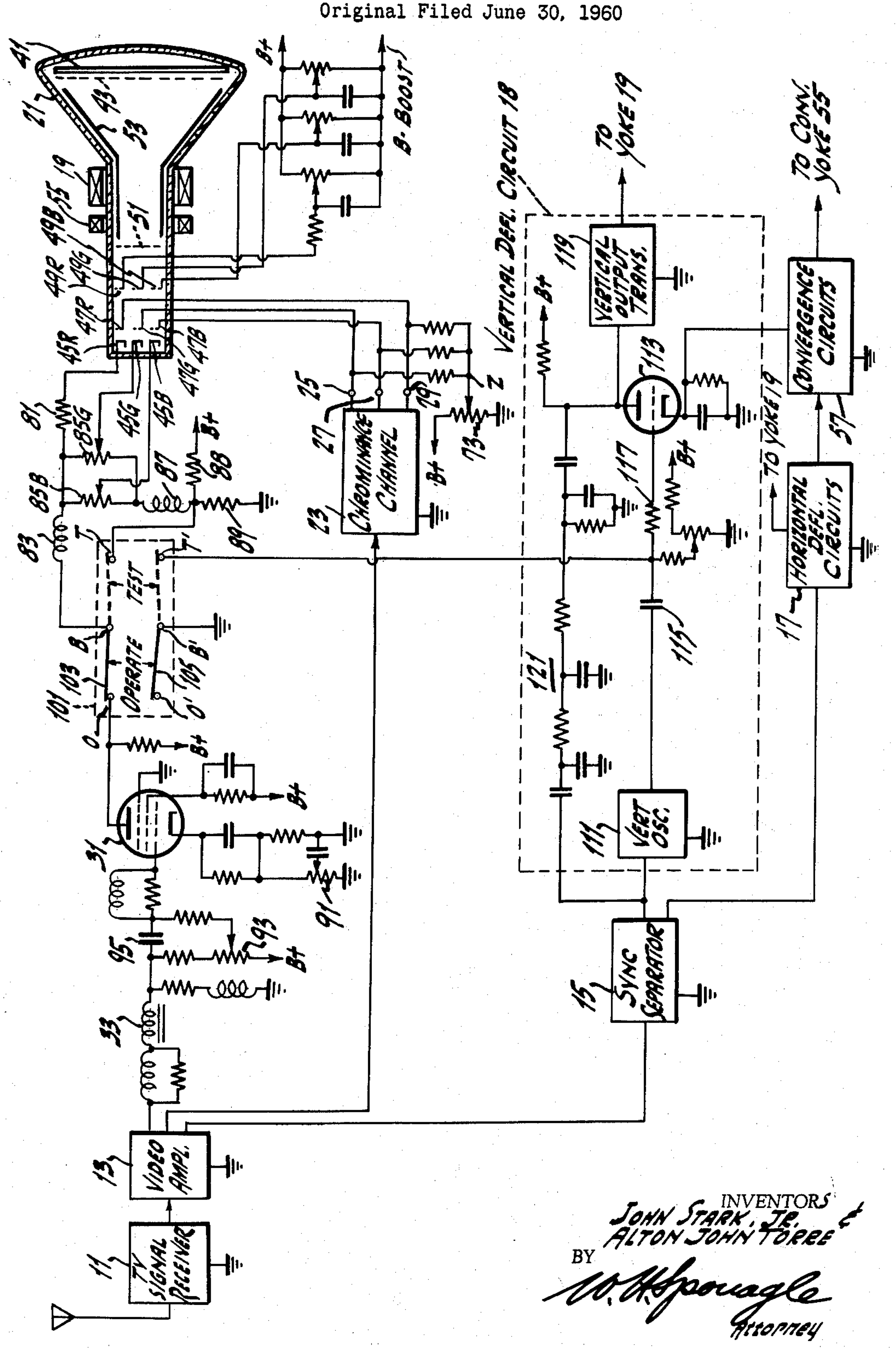
INVENTORS
JOHN STARK, JR. &
ALTON JOHN TORRE
BY
W. H. Sprague
Attorney United States Patent Office 3,114,796 Patented Dec. 17, 1963

3,114,796

COLOR KINESCOPE SET-UP PROCEDURES FOR COLOR TELEVISION RECEIVERS

John Stark, Jr., Indianapolis, Ind., and Alton John Torre, Woodbury, N.J., assignors to Radio Corporation of America, a corporation of Delaware Original application June 30, 1960, Ser. No. 39,912. Divided and this application Jan. 2, 1962, Ser. No. 163,435
7 Claims. (Cl. 178—5.4)

This invention relates to color television receivers, and more particularly to color kinescope set-up procedures for establishing optimum operating conditions in such receivers. This application is a division of our copending application, Serial No. 39,912, filed June 30, 1960.

In color television receivers of the type employing a multi-gun color kinescope, such as the well-known three-gun, shadow mask color kinescope, a plurality of operating controls for the kinescope are conventionally provided. A number of these controls have no direct counterparts in the typical black and white television receiver, employing the usual single-gun black and white kinescope; the additional controls are, of course, necessitated by the additional complexity of a multi-gun, multi-phosphor reproducer as compared with a single-gun, single-phosphor kinescope.

A color television receiver representative of practices heretofore includes the following operating controls in association with the color kinescope: separate red, green and blue background controls providing individual control of the biases applied, respectively, to the control grids of the red, green and blue electron guns (each control grid being supplied, in operation, with a separate color difference signal); and separate blue and green screen controls for individually adjusting the operating potential supplied to the screen grids of the blue and green electron guns, respectively. The respective cathodes of the three electron guns are returned to a fixed bias (as is the red gun's screen electrode), but the common luminance signal channel, serving to apply a luminance signal to all of the cathodes, includes a brightness control and a contrast control.

To provide optimum operation in the color kinescope, the controls associated with the kinescope are adjusted in accordance with a procedure, conventionally referred to as a color kinescope set-up procedure, in order to correct for a number of variations inherently resulting from the multi-gun, multi-phosphor character of the reproducer. Such variations include differences in the cutoff potentials of the respective guns, differences in the cathode emission of the respective guns, and differences in the efficiencies of the respective phosphors. A goal of the set-up procedure may be viewed as obtaining the brightest picture possible, while maintaining proper "tracking" at all brightness levels. That is, it is desired that the color kinescope reproduce white information with the proper color temperature at all brightness levels between maximum white and minimum white, with the color kinescope being capable of reproducing information which represents the maximum white level at the highest achievable level of brightness. The set-up procedures conventionally associated with a receiver having operating controls as enumerated above require a succession of interrelated adjustments of the brightness control and the various background and screen controls. These conventional procedures are somewhat tedious, the interplay between the various controls requiring considerable ingenuity and patience to arrive at the precisely proper conditions. Adjustments of the background controls often require retouching of the screen controls, and vice versa.

In our aforementioned copending application, Serial No. 39,912, a novel system of operating controls for the color kinescope of a color television receiver is disclosed. The present invention is directed to a simplified set-up procedure using such controls. In accordance with an embodiment of the control arrangement of said copending aplication, the kinescope operating controls comprise the following: separate red, green and blue screen controls for individually adjusting the respective operating potentials applied to the screen electrodes of the respective electron guns; a single master bias control common to the respective control grids of the kinescope; and respective green and blue drive controls, individually controlling the magnitude of the luminance signal applied to the respective green and blue cathodes of the kinescope. The luminance channel of the receiver, as before, includes respective brightness and contrast controls. The novel arrangement of kinescope operating controls just described permits use of a markedly simplified set-up procedure involving successive independent, single step adjustments, and eliminating the tedious interplay between operating control adjustments. The respective screen controls correct for cutoff variations among the guns. The master bias control reduces the range of screen control adjustment required. The green and blue drive control adjustments correct for phosphor efficiency variations and cathode emission variations.

In accordance with a further feature of the present invention, switching apparatus may be incorporated in the receiver to facilitate the set-up adjustments. In a preferred form of the invention, this apparatus permits one, when making set-up adjustments, to selectively swtich the receiver from its normal operating condition to a set-up condition in which: (*a*) the normal luminance channel drive to the kinescope cathodes is disabled, (*b*) a predetermined reference black level voltage is applied to each of the kinescope cathodes, the applied reference voltage being effectively independent of drive control adjustments, and (*c*) the receiver's vertical deflection circuitry is disabled to permit critical adjustment of the cutoff potential of each gun. By use of such switching apparatus, proper set-up adjustments may be achieved at any time desired without concern for the nature of the program material available at that time, and with an accuracy difficult to match by set-up procedures effected with reliance on displayed program material.

It is a primary object of the present invention to provide novel and improved methods of setting up a color kinescope for optimum operation.

Other objects and advantages of the present invention will be readily appreciated by those skilled in the art after reading of the following detailed description, and an inspection of the accompanying drawing in which the sole figure illustrates in block and schematic form a color television receiver incorporating apparatus which may be used for effecting novel color kinescope set-up procedures in accordance with an embodiment of the present invention.

A color television receiver is illustrated with the usual head-end structure, including RF amplifier converter, IF amplifier and video detector, designated generally by the block labeled TV signal receiver 11. The detected composite color television signal output of the signal receiver 11 is applied to a video amplifier 13 having a plurality of separate outputs. One of the video amplifier outputs is applied to a sync separator 15 for recovery of the deflection synchronizing components of the composite signal, which synchronizing components are applied to the usual horizontal and vertical deflection circuits 17 and 18, respectively. The deflection circuits serve to develop suitable deflection waveforms for energizing the respective horizontal and vertical windings on the deflection yoke 19. The deflection yoke 19 is provided to effect suitable deflection of the electron beams of a color kinescope 21, which serves as the color image reproducer of the receiver. The illustrated color kinescope 21 is of the well-known three-beam, shadow mask type, the detail structure of which will be discussed subsequently.

Another output of the video amplifier 13 is supplied to a chrominance channel 23, which conventionally includes suitable apparatus for selecting the modulated color subcarrier component of the composite signal, amplifying the selected signal component, and synchronously detecting the amplified modulated color subcarrier component. Associated with the subcarrier detecting apparatus of the chrominance channel 23 is a local source of reference oscillations of color subcarrier frequency, suitably synchronized in accordance with the color synchronizing component of the composite signal for achieving the desired synchronous detection. The subcarrier detecting apparatus may include suitable matrixing apparatus for combining the synchronous detector outputs to achieve production of the desired color difference signal outputs. In the illustrated embodiment of FIGURE 1, these outputs comprise three individual color difference signals of the form R—Y, B—Y and G—Y, appearing respectively at output terminals 25, 27 and 29. These signals are supplied to respective grid electrodes of the electron gun structure and color kinescope 21 in association with the apparatus to be described in more detail subsequently.

Another output of the video amplifier 13 is applied to the grid of a luminance amplifier tube 31 via a coupling circuit which includes the usual luminance delay line 33, serving to equalize the delay of the luminance signal component of the composite signal (applied to the color kinescope 21 via the luminance amplifier tube 31) with the delay inherently suffered by the chrominance component in the chrominance channel 23. The amplified luminance signal output appearing at the anode of tube 31 is applied to the cathode electrodes of the electron gun structure of color kinescope 21. The apparatus utilized in effecting the application of the luminance signal output of tube 31 to color kinescope 21, as well as the apparatus utilized to apply the previously mentioned color difference signal outputs of chrominance signal channel 23 thereto, conform to the purposes of the present invention in a manner which will be more readily appreciated following a brief consideration of the operating principles of the color kinescope 21, the problems to be encountered in use thereof, and the operating parameter adjustments accordingly desired.

The color kinescope 21 incorporates a phosphor screen 41 made up of a pattern of triads of red, blue and green light emitting phosphors. A multi-apertured mask 43 is interposed in the path of electrons from the electron gun structure of the color kinescope to the screen 41. The angle of approach of the electron beam to the mask aperture determines which of the phosphors of the respective associated triad will be energized to cause light emission.

The electron gun structure of the color kinescope 21 comprises three separate electron guns arranged to produce respective beams destined to approach the mask at respectively different angles such as to selectively cause light emission from respective ones of the triad phosphors. Thus, the electron gun which produces the beam that strikes only the red-emitting phosphor of each triad on the screen 41 may be designated as the red electron gun, etc. The red electron gun of color kinescope 21 includes a cathode 45R, a control grid 47R, and a screen grid 49R (serving as a first anode or first accelerating electrode). Similarly, the blue electron gun comprises cathode 45B, control grid 47B, and screen grid 49B, while the green electron gun comprises cathode 45G, control grid 47G, and screen grid 49G. A commonly energized focus electrode structure 51 is associated with each of the three electron guns. The electrode structure of color kinescope 21 further includes an ultor electrode 53, energized at a high voltage level to supply the final acceleration of the respective beams.

To insure proper convergence of the three beams at the target structure 41, 43 a convergence yoke assembly 55 is associated with the color kinescope 21, and energized with suitable dynamic waveforms derived by the convergence circuits 57 from waveforms developed in the deflection circuits 17 and 18.

In effecting proper operation of the color kinescope 21 certain practical problems arise, which are complicated by the multiple gun, multiple phosphor nature of the reproducer. For example, the cutoff characteristics of the three guns, while ideally identical, inevitably differ to some extent. Likewise, the efficiencies of the three types of phosphors employed at the screen in producing light in response to the electron bombardment are never perfectly matched. Also, the emission characteristics of the cathodes of the three guns are not necessarily alike. The problems would not be too severe with respect to the above noted differences between the characteristics of the respective guns and the respective phosphors if such differences were encountered to a like degree in each tube as produced; however, this is not the case, since the differences will vary from tube to tube.

In addition to the foregoing problems, it will be appreciated that the usual receiver requirements are also present which render it desirable to provide a control for the brightness level of the reproduced image, as well as a contrast control therefor.

The present invention is directed to novel set-up procedures utilizing a novel arrangement of operating controls for the color kinescope, whereby the operating parameters may be adjusted to provide optimum color and black and white reproduction on the kinescope screen in the face of the above noted problems.

To provide adjustments to correct for cutoff characteristic variations between the respective guns, individual controls are provided for setting the D.C. operating voltage supplied to the screen grid of each of the three electron guns. Thus, the screen grid 49R of the red gun is returned through a dropping resistor to the adjustable tap of the red screen potentiometer 71R. The end terminals of the potentiomter 71R are connected respectively to a point of B+ potential and a point of B-boost potential. Adjustment of the position on the tap varies the positive D.C. potential on the red screen grid 49R. The screen potentiometer 71G and the blue screen potentiometer 71B similarly provide control of the positive D.C. potentials on the green screen grid 49G and the blue screen grid 49B, respectively.

It will be noted that, while individual bias controls are thus provided for the respective screen grids, no individual bias controls are provided for the respective control grids of the three electron guns. Each of the three control grids 47R, 47B and 47G is returned via a similarly valued resistor to a common terminal Z. A common control grid bias adjustment is provided, however; the common terminal Z is connected to the adjustable tap on a master bias potentiometer 73, the end terminals of each which are connected to a point of B+ potential and a point of ground potential, respectively. Adjustment of the position of the tap on the potentiometer 73 varies a positive bias applied in common to all three of the control grids. The respective color difference signal outputs of chrominance channel 23 are delivered to the individual control grids via separate signal coupling paths.

Inspection of the output circuitry of the luminance amplifier 31 reveals that means are provided for adjusting the magnitude of the luminance driving signal applied to the respective cathodes of two of the three electron guns; no individual luminance drive adjustment is provided in the luminance signal path to the third cathode. In the specific embodiment shown in the drawing, the cathode receiving the fixed luminance drive is the cathode 45R of the red gun, which is coupled to the anode of the luminance amplifier tube 31 by a signal path which comprises resistor 81 and series peaking coil 83. The upper end terminals of a blue drive potentiometer 85B and a green drive potentiometer 85G are jointly connected to the junction of the peaking coil 83 and the resistor 81. The lower end terminals of the potentiometers 85B and 85G are connected together, and return to ground through a path consisting of a shunt peaking coil 87 in series with a resistor 89. The blue cathode 45B is directly connected to the adjustable tap on blue drive potentiometer 85B, and the green cathode 45G is directly connected to the adjustable tap on the green drive potentiometer 85G.

Adjustment of the position of the tap on the blue potentiometer 85B selectively varies the amount of luminance signal supplied to the blue gun, while adjustment of the tap on the green drive potentiometer 85G selectively varies the amplitude of the luminance signal supplied to the green gun. A master contrast controlling potentiometer 91, arranged in a conventional circuit configuration in the cathode circuit of luminance amplifier 31, provides a means for adjusting the magnitude of the luminance signal drive to the three guns in common. Control of the D.C. level of the luminance signal supplied to all of the guns is provided by a brightness control potentiometer 93 included in a direct current conducting luminance signal path shunting the coupling capacitor 95 in the grid circuit of the luminance amplifier tube 31. For an explanation of this form of brightness control, reference may be made to U.S. Patent No. 2,872,617, issued to J. Stark, Jr., et al. on February 3, 1959.

Also associated with the apparatus for applying the luminance signal drive to the three guns of the color kinescope 21, but not heretofore mentioned, is a double-pole, double-throw switch 101. The switch 101, which may be of conventional construction, has a pair of movable blades 103 and 105, and the usual set of six terminals, B, B′, O, O′, T, and T′. Terminals B and B′ are permanently connected to the blades 103 and 105, respectively. When switch 101 is thrown into a first of its switching positions, designated Operate, blade 103 provides a direct connection between terminal O and terminal B, and blade 105 provides a direct connection between terminal O′ and terminal B′. When switch 101 is thrown to the second of its switching positions, designated Test, blade 103 provides a direct connection between terminal B and terminal T, and blade 105 provides a direct connection between terminal B′ and terminal T′.

The anode of luminance amplifier tube 31 is directly connected to terminal O of switch 101. The end of series peaking coil 83 remote from the kinescope cathodes is directly connected to terminal B of switch 101. The junction of shunt peaking coil 87 and resistor 89 is directly connected to terminal T of switch 101. Thus, when switch 101 is thrown to the Operate position, a path is completed for the transfer of luminance signal output appearing at the anode of tube 31 to the coil 83 and thence to the color kinescope cathodes 45R, etc.

However, when switch 101 is thrown to the Test position, the luminance signal drive to the color kinescope cathodes is disrupted. In lieu of the application of luminance signals to the color kinescope cathodes, a test D.C. potential is applied thereto, the test potential being derived from the receiver's B+ potential by a voltage divider formed by resistor 89 and a resistor 88, the latter being connected between a point of B+ potential and the junction of coil 87 and resistor 89. The reference potential applied to cathodes 45G and 45B is independent of the settings of the drive potentiometers 85G and 85B, since substantially the same D.C. potential appears at both end terminals of each of these potentiometers when switch 101 is in the Test position.

To appreciate the switching function performed by blade 105 of the double-pole, double-throw switch 101, reference should first be made to a more detailed consideration of the vertical deflection circuits 18, shown partially in schematic form and partially in block form. The vertical deflection circuits 18 comprise a vertical oscillator stage 111, responsive to the deflection synchronizing component output of sync separator 15; a vertical output tube 113, the grid of which receives a driving waveform from the output of vertical oscillator 111 via a coupling path including a coupling capacitor 115 and a coupling resistor 117 in series; and a vertical output transformer 119 supplying the output of tube 113 to the vertical deflection windings of yoke 19. A feedback path, generally designated 121, from the output of tube 113 to the input of the vertical oscillator stage 111, aids in sustaining vertical frequency oscillations therein. A vertical frequency waveform is supplied to the convergence circuits 57 from the cathode of vertical output tube 113.

Returning to a consideration of the operation of switch 101, it is noted that terminal T′ of switch 101 is directly connected to the junction of coupling capacitor 115 and coupling resistor 117 in the grid circuit of vertical output tube 113. Terminal B′ of switch 101 is grounded, while terminal O′ of switch 101 is unconnected. When switch 101 is in the Operate position, blade 105 merely grounds the unconnected terminal O′. However, when switch 101 is in the Test position, blade 105 serves to return the junction of coupling capacitor 115 and coupling resistor 117 directly to ground. Since such grounding prevents the application of the vertical oscillator output to the vertical output tube 113, the vertical deflection circuits 18 are thereby effectively disabled, and the vertical windings of yoke 19 are thus not energized by a vertical deflection waveform when switch 101 is in the Test position.

An appreciation of the functions of the various controls described above may now best be obtained by considering the sequence of procedures to be followed in setting up a color kinescope with such controls. The preferred sequence of adjustments may be summarized as follows:

(1) Switch 101 is thrown to the Test position.

(2) The master bias potentiometer 73 and the three screen potentiometers 71R, 71G and 71B are all turned to their minimum bias positions.

(3) Each of the screen potentiometers is adjusted to increase the bias until the respectively associated gun is caused to just "light" (i.e. until a barely visible horizontal line trace is produced on the kinescope screen 41 by the bombardment of electrons from that gun).

(3*a*) If increase of the screen bias on any gun to the maximum bias position is still inadequate to just "light" the gun, the master bias potentiometer 73 is advanced (with the subject screen potentiometer left at its maximum bias position) to increase the control grid bias until the gun just "lights"; the settings of the remaining screen potentiometers are then adjusted to satisfy the test of step 3 under the new control grid bias conditions.

(4) Switch 101 is thrown from the Test position back to the Operate position.

(5) With the receiver's contrast and brightness control potentiometers 91 and 93 set at normal adjustments for normal signals, the green and blue drive potentiometers 85G and 85B are adjusted for desired color temperature (i.e. are adjusted so that black and white images are reproduced on the kinescope screen 41 as gray scale variations of the desired "white").

Those familiar with the color television receiver controls and set-up procedures heretofore employed will readily appreciate that the foregoing sequence of set-up adjustments represents a marked improvement over the procedures required in prior art receivers. The contemplated set-up procedure is relatively simple, straightforward and involves a sharp reduction in the requirements of "retouching" controls in arriving at optimum conditions. Among the specific advantages is the elimination of interplay between adjustments of individual screen and control grid bias controls. While a master control grid bias potentiometer 73 has been incorporated in the described control apparatus, this requires only one screen control retouching step (and even this one retouching step is often not required). The inclusion of the master control grid bias potentiometer serves the purpose of reducing the range of adjustment required for the individual screen bias controls. It is contemplated that with improvements in color kinescope tolerance and drive requirements, the total range of individual bias adjustments for the respective guns may be appreciably reduced. A further simplified embodiment of the present invention is thus contemplated, whereby the master control grid bias potentiometer 73 may be eliminated, with the range of adjustment of individual screen bias control potentiometers being sufficient to carry out, alone, the necessary adjustments of the respective gun cutoff characteristics. In such a simplified set-up procedure, step 3*a* of the previously listed sequence is eliminated.

What is claimed is:

1. A method of effecting the set-up of a color kinescope in a color television receiver, said color kinescope having a luminescent screen and a plurality of electron guns each comprising a cathode, control grid and screen grid, which comprises the steps of: applying a common reference bias potential to all of the cathodes of said plurality of electron guns; individually increasing the bias on the screen grid of each of said plurality of guns until that gun produces a barely visible trace on the screen of the color kinescope; removing the common reference potential from the cathodes of the plurality of electron guns and applying a luminance signal thereto; and individually adjusting the amplitude of the luminance signal applied to several of said cathodes to arrive at reproduction of black and white images on the screen of said color kinescope at a desired color temperature.

2. A method of effecting the set-up of a color kinescope in a color television receiver, said color kinescope having a luminescent screen and a plurality of electron guns each comprising a cathode, control grid and screen grid, said color television receiver also including means for deflecting electron beams produced by the respective electron guns in a pair of mutually perpendicular directions, said method comprising the steps of: (A) applying a common reference bias potential to all of the cathodes of said plurality of electron guns; (B) disabling the deflection of all of said electron beams in one of said pair of mutually perpendicular directions; (C) setting the respective biases on the control grid and screen grid of all of said plurality of guns at a minimum value; (D) individually increasing the bias on the screen grid of each of said plurality of guns until that gun produces a barely visible trace on the screen of the color kinescope; and (E), when increase of the bias on the screen grid of any one of said plurality of guns to the maximum attainable value fails to result in the production of a visible trace on said screen, increasing in common the bias on the control grids of all of said plurality of guns until that gun theretofore failing to produce a visible trace produces a barely visible trace on said screen, and then individually adjusting the bias on the screen grid of each of the remaining ones of said guns until that gun produces a barely visible trace on said screen under said condition of increased common control grid bias.

3. A method of effecting the set-up of a color kinescope in a color television receiver, said color kinescope having a luminescent screen and a plurality of electron guns each comprising a cathode, control grid and screen grid, said color television receiver also including means for deflecting electron beams produced by the respective electron guns in a pair of mutually perpendicular directions, said method comprising the steps of: (A) applying a common reference bias potential to all of the cathodes of said plurality of electron guns; (B) disabling the deflection of all of said electron beams in one of said pair of mutually perpendicular directions; (C) setting the respective biases on the control grid and screen grid of all of said plurality of guns at a minimum value; (D) individually increasing the bias on the screen grid of each of said plurality of guns until that gun produces a barely visible trace on the screen of the color kinescope; (E) when increase of the bias on the screen grid of any one of said plurality of guns to the maximum attainable value fails to result in the production of a visible trace on said screen, increasing in common the bias on the control grids of all of said plurality of guns until that gun theretofore failing to produce a visible trace produces a barely visible trace on said screen, and then individually adjusting the bias on the screen grid of each of the remaining ones of said guns until that gun produces a barely visible trace on said screen under said condition of increased common control grid bias; (F) removing the common reference potential from the cathodes of the plurality of electron guns and applying luminance signals thereto; (G) enabling the deflection of said electron beams in both of said pair of mutually perpendicular directions; and (H) individually adjusting the amplitude of the luminance signal applied to each of said cathodes but one, until reproduction of black and white images on the screen of said color kinescope occurs at a predetermined color temperature.

4. A method of effecting the set-up of a color kinescope in a color television receiver, said color kinescope having a luminescent screen and a plurality of electron guns each comprising a cathode, control grid, and screen grid, which comprises the steps of: restricting all of the cathodes of said plurality of electron guns to a substantially equipotential relationship at a given direct current potential; individually adjusting the screen grid-to-cathode bias of each of said plurality of guns until that gun produces a barely visible trace on the screen of the color kinescope; applying a luminance signal to the cathodes of said plurality of electron guns while permitting said cathodes to depart from said equipotential relationship; and individually adjusting the amplitude of the luminance signal applied to several of said cathodes to arrive at reproduction of black and white images on the screen of said color kinescope at a desired color temperature.

5. A method of effecting the set-up of a color kinescope in a color television receiver, said color kinescope having a luminescent screen and a plurality of electron guns each comprising a cathode, control grid and screen grid, said color television receiver also including means for deflecting electron beams produced by the respective electron guns in a pair of mutually perpendicular directions, said method comprising the steps of: establishing a common direct current potential on all of the cathodes of said plurality of electron guns; disabling the deflection of all of said electron beams in one of said pair of mutually perpendicular directions; individually increasing the screen grid-to-cathode bias of each of said plurality of guns in a beam intensifying direction until arrival at a bias at which that gun produces a barely visible line trace on the screen of the color kinescope; and, when adjustment of the screen grid-to-cathode bias of any one of said plurality of guns in said beam intensifying direction is pursued to the attainable limit without resulting in the production of a visible line trace on said screen, increasing in common the control grid-to-cathode bias of all of said plurality of guns in a beam intensifying direction until arrival at a control grid-to-cathode bias at which that gun theretofore failing to produce a visible trace produces a barely visible trace on said screen, and then individually adjusting the screen grid-to-cathode bias of each of the remaining ones of said guns until arrival at a screen grid-to-cathode bias at which that gun produces a barely visible trace on the screen under said condition of increased common control grid-to-cathode bias.

6. A method of effecting the set-up of a color kinescope in a color television receiver, said color kinescope having a luminescent screen and a plurality of electron guns each comprising a cathode, control grid and screen grid, said color television receiver also including means for deflecting electron beams produced by the respective electron guns in a pair of mutually perpendicular directions, said method comprising the steps of: establishing a common direct current potential on all of the cathodes of said plurality of electron guns; disabling the deflection of all of said electron beams in one of said pair of mutually perpendicular directions; individually increasing the screen grid-to-cathode bias of each of said plurality of guns in a beam intensifying direction until arrival at a bias at which that gun produces a barely visible line trace on the screen of the color kinescope; when adjustment of the screen grid-to-cathode bias of any one of said plurality of guns in said beam intensifying direction is pursued to the attainable limit without resulting in the production of a visible line trace on said screen, increasing in common the control grid-to-cathode bias of all of said plurality of guns in a beam intensifying direction until arrival at a control grid-to-cathode bias at which that gun theretofore failing to produce a visible trace produces a barely visible trace on said screen and then individually adjusting the screen grid-to-cathode bias of each of the remaining ones of said guns until arrival at a screen grid-to-cathode bias at which that gun produces a barely visible trace on the screen under said condition of increased common control grid-to-cathode bias; permitting the cathodes of said plurality of electron guns to depart from said common direct current potential relationship and applying luminance signals thereto; enabling the deflection of said electron beams in both of said pair of mutually perpendicular directions; and individually adjusting the amplitude of the luminance signal applied to several of said cathodes until reproduction of black and white images on the screen of color kinescope occurs at a desired color temperature.

7. A method of effecting the set-up of a multi-gun color kinescope in a color television receiver which comprises the steps of: individually adjusting beam intensity controlling biases of the respective guns of the color kinescope to achieve corresponding beam intensities just above light production cutoff for each gun under test conditions inclusive of beam deflection in only one scanning direction and of disruption of normal luminance signal application to said guns; and adjusting the relative magnitude of luminance signal drive to the respective guns to achieve production at the screen of said color kinescope of white light of a desired color temperature under normal operating conditions inclusive of beam deflection in two mutually perpendicular scanning directions and of nondisrupted luminance signal application to said guns.

References Cited in the file of this patent

RCA Color Television Service Data, 1960, No. T5 for CTC10 Chassis Series, first printing May 10, 1960, pp. 7 and 31–33 relied on.